Sept. 10, 1929.　　　L. S. COX ET AL　　　1,727,750
CAT HEAD
Filed Sept. 21, 1925　　　2 Sheets-Sheet 1

INVENTORS:
LUTHER S. COX,
HOMER A. DELANEY.
BY Fad Mumir
ATTORNEY.

Patented Sept. 10, 1929.

1,727,750

UNITED STATES PATENT OFFICE.

LUTHER S. COX, OF NEWHALL, AND HOMER A. DELANEY, OF FULLERTON, CALIFORNIA.

CATHEAD.

Application filed September 21, 1925. Serial No. 57,746.

Our invention relates to rotary draw-works of well drilling equipment, and it consists in a novel cat head which forms a part of such draw-works.

In the oil well industry various tubular members are used, such as the drill pipe and pump tubing which are extended into the well. Such tubular members consist of lengths of pipe or joints, as they are called, which are secured together by couplings. The rotary draw-works of the common type has a cat head which is used in breaking joints of these tubular members. The ordinary cat head comprises a spool which is rigidly fixed to the line shaft of the draw-works. The cat head man, whose duty it is to take care of the operation of the tongs, is required to first properly set the tongs and then run to the cat head, throwing a rope secured to the tongs therearound and pull on the rope until the joint is finally broken. He must then unwind the rope from the cat head and return to the tongs.

It is an object of this invention to provide a novel form of cat head which will not require the cat head man to go from the tongs to the cat head, but he may remain at the tongs, and joints of the tubular member may therefore be more quickly broken.

It is a further object of this invention to provide a clutch driven cat head to which the tongs rope is secured during the breaking of joints.

It is another object of this invention to provide a means for fixing the tongs rope to the cat head.

It is also an object of this invention to provide a cat head of the class described in which the joints of pipe may be easily broken.

It is another object of this invention to provide a cat head having a novel construction which provides a lubricating chamber for giving lubrication to the bearing of the cat head.

It is a further object of this invention to provide a cat head which does not destroy the tongs rope by burning, as is the case in the ordinary type of cat head.

It is a still further object of this invention to provide a cat head which does not require a workman to come near the spool thereof, thus eliminating the possibility of accidents due to workmen being tangled in the tongs rope and drawn against the draw-works as sometimes occurs with the ordinary cat head.

It is an object of this invention to provide a cat head having a unique construction which contributes to longevity, rigidity, economy of manufacture and installation, and ease of operation, all of which features cooperate to provide a superlative cat head.

Other objects and advantages of the invention will be made evident hereinafter.

Referring to the two drawings in which we illustrate our invention,

Figure 1:
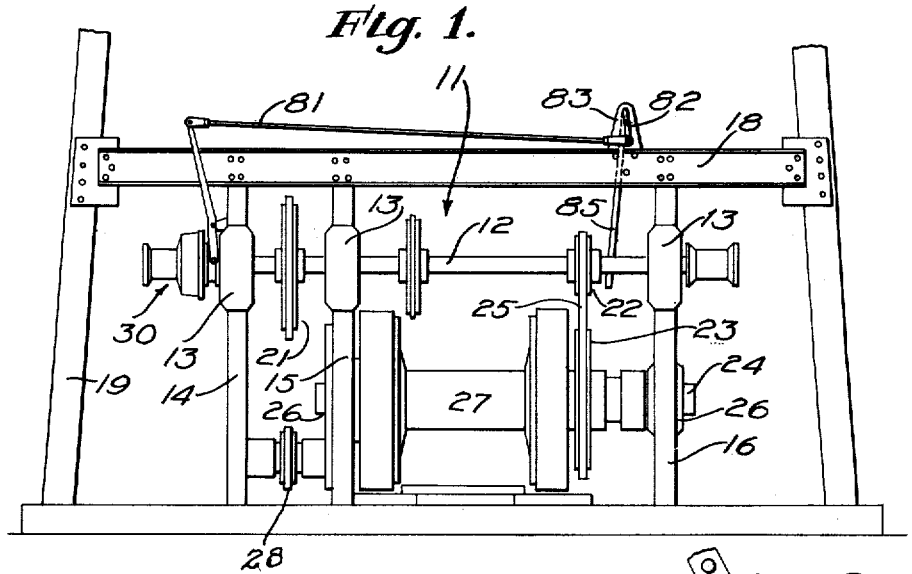
Fig. 1 is an elevational view of a draw-works embodying the cat head of our invention.
Figure 2:
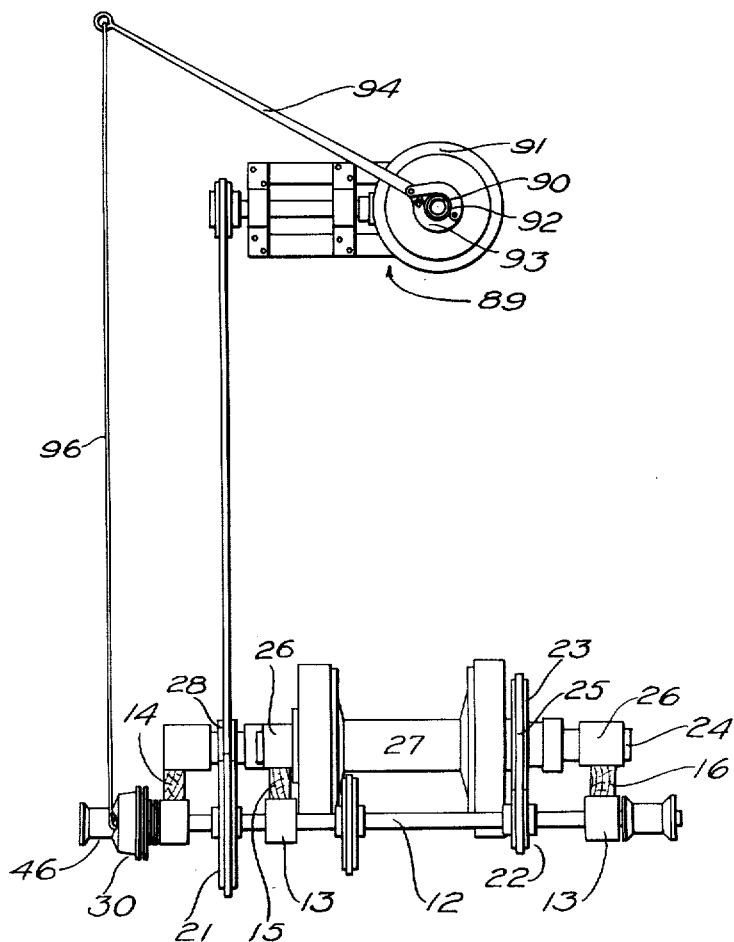
Fig. 2 is a plan view showing the use of our invention.

With reference particularly to Figs. 1 and 2 of the drawings, the derrick equipment of an oil well includes a rotary draw-works 11. The rotary draw-works 11 is provided in the form of a counter-shaft 12 which is rotatably supported by bearings 13 which are supported by vertical posts 14, 15 and 16. The lower ends of these posts 14, 15 and 16 are secured to the floor of the derrick and the upper ends thereof are secured to a cross girder which is rigidly secured to legs 19 of the derrick. The counter-shaft 12 may be driven by means of a sprocket 21. A sprocket 22 secured to the counter-shaft 12 is adapted to drive a sprocket 23 secured to a drum-shaft 24 by means of a chain 25. The drum-shaft 24 is journaled in bearings 26 and carries a spooling drum 27. A sprocket 28 is provided for driving the rotary machine 89.

Figure 3:
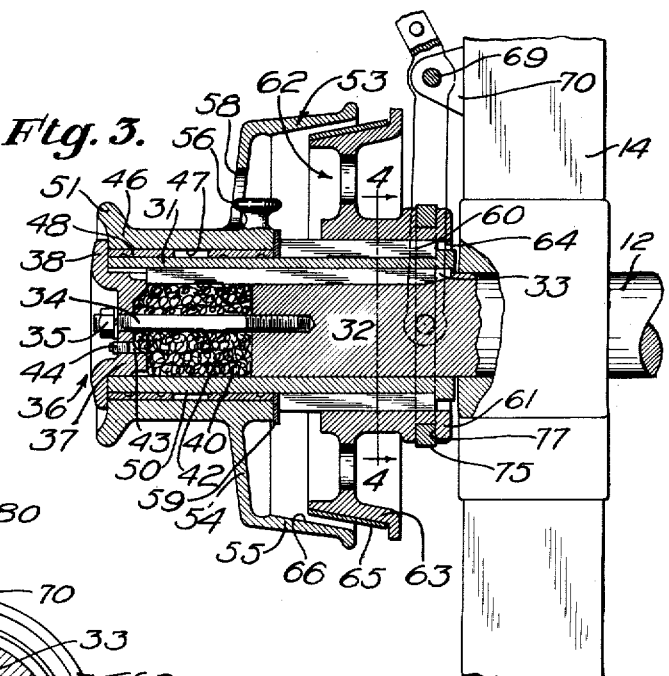
Fig. 3 is an enlarged vertical section taken through the cat head of our invention.
Figure 4:
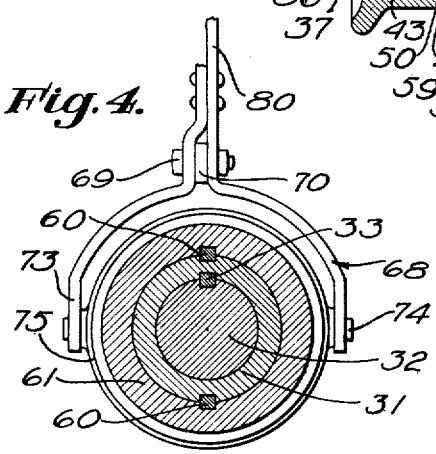
Fig. 4 is a section taken on the line 4—4 of Fig. 3.

A cat head 30 embodying the features of our invention is secured at the left end of the counter-shaft 12, the details of which are clearly shown in Figs. 3 and 4. With reference to these figures a quill 31 is rigidly secured on an end 32 of the counter-shaft 12 by means of a key 33. As shown in Fig. 3 the outer end of the quill 31 extends beyond the end 32 of the shaft 12. Extended from the end 32 of the shaft 12 is a stud bolt 34 on which a nut 35 is threaded for securing a cap 36 to the end of the quill 31. This cap 36 is centralized by a cylindrical portion 37 which extends into the end of the quill 31 and the cap has a radial flange 38. A closed oil chamber 40 is thus provided in which waste 42 may be placed. An opening 43 in the cap which communicates between the exterior and the oil chamber 40 serves as a means by which oil may be introduced to the chamber 40. This opening 43 is closed by a plug 44.

A spool 46 having a cylindrical bore 47 in which a bushing 48 is pressed is rotatably disposed on the end of the quill 31. The peripheral portion of the flange 38 of the cap 36 prevents the spool 46 from moving outward from the quill 31. The outer end of the spool 46 is provided with a flange or rim 51. Formed at the inner end of the spool 46 is a clutch housing 53, a radial wall 54 of which extends from the spool 46 and has a substantially cylindrical wall 55 formed at the outer end thereof. A knob 56 is provided at the extreme inner end of the spool 46 and access thereto is provided by an opening 58 formed in the radial wall 54 of the clutch housing 53.

Secured to the quill 31 at the inner end thereof is a plurality of feather keys or splines 60. A ring 59 is placed between the feather keys 60 and the inner end of the spool 46. A hub 61 of a clutch cone 62 surrounds the inner end of the quill 31 and has slots 64 formed therein in which outer portions of the feather keys 60 extend. The feather keys 60 secure the clutch cone 62 to the inner end of the quill 31 so that it is non-rotatable relative thereto, but is slidable thereon. The clutch cone 62 has a rim 63 which has a conical outer face carrying a facing 65. The clutch cone 62 is adapted for movement so that the facing 65 will engage and disengage a conical face 66 of the wall 55 of the clutch housing 53.

The clutch cone 62 is moved from and into these positions by means of a yoke 68 which is pivoted on a bolt 69, this bolt 69 being supported by a bracket 70, which bracket 70 is secured to the vertical post 14. The ends of legs 73 of the yoke 68 each have an opening into which a pin 74 of a ring 75 extends. This ring 75 is loosely carried in an annular groove 77 of the hub 61 of the clutch cone 60. A lever 80 extends from the yoke 68, said lever being operated through a link 81 which extends from a crank 82. The crank 82 is supported by a bracket 83 of the girder 18 and is operated by a lever 85.

When the counter-shaft 12 rotates and the clutch cone 62 is in the position shown in the drawings, the clutch housing 53 of the spool 46 is not engaged and therefore the spool 46 is not driven by the line shaft 12. When the lever 85 is operated in a manner to swing the yoke 68 to engage the clutch cone 62 with the housing 53, the spool 46 is driven by the line shaft 12.

The operation of our invention may be best understood with reference to Fig. 2. In this figure we show a drill pipe 90 which extends from the well through a rotary table 91 of a rotary machine 89. Placed on a coupling 92 of the drill pipe 90 is a pipe tongs 93 having an extended handle 94. A pipe tongs rope 96 which may be any suitable flexible member is secured to the end of the handle 94 of the tongs 93 and is extended to the spool 46 of the cat head 30. The tongs rope 96 is secured to the spool 46 by tying the end thereof around the knob 56 in a suitable manner. At this time the line shaft 12 is being rotated and the clutch cone 62 is disengaged from the housing 53. Therefore, the spool 46 does not rotate with the counter-shaft 12. After the cat head man has properly set the tongs 93, the driller operates the lever 85 of the draw-works 11 in order to move the clutch cone 62 into engagement with the clutch housing 53. As this engagement is established the spool 46 is gradually brought into motion and the joint of the drill pipe is broken, the rope 96 being wound on the spool 46. This rope is confined upon the spooling portion by the radial wall 54 of the housing 53 and the outer flange 51. The lower part of the string of drill pipe 90 may be locked from rotation by the rotary table 91, or a separate pair of tongs, not shown, may be employed for this purpose. After the joint has been broken, the driller operates the lever 85 to disengage the clutch. The cat head man may then swing the tongs 93, and the tongs rope 96 will be easily unwound from the spool 46.

From this it will be seen that the breaking of a joint is very simple and that it is not necessary for the cat head man to leave the tongs as is necessary in the ordinary fixed cat head. This eliminates considerable going back and forth and thus saves much time. It is an easy matter for the driller to slip the clutch and he soon learns to control the cushioned pull required for this purpose. If the joint happens to be a difficult one to break, the driller simply speeds up the engine driving the draw-works 11, and the tool joint is broken by giving the lever 85 a quick jerk so as to quickly engage the clutch cone 62 with the clutch housing 53.

There is no slippage between the tongs rope 96 and the cat head 30. Therefore, there will be no burning of this tongs rope 96 as in the case of the old fixed type of cat head, caused by slippage of rope. A considerable saving is made in this respect. Owing to the fact that the cat head clutch is controlled by the driller by an operation of the lever 85, no one is required to come in contact with the tongs rope 96 near the spool 46 of the cat head. It is, therefore, practically impossible for the occurrence of accidents caused by workmen being pulled into the draw-works by a catching of the rope thereon as has sometimes occurred with the ordinary fixed cat head.

The construction of the cat head 30 of our invention, as a whole, is quite unique and possesses many features of construction which are obvious from the foregoing description. By extending the quill 31 farther than the end 32 of the shaft 12 it is possible to make room for the placing of the spool 46 and the clutch of our invention, and also to provide the novel lubricating chamber 40 which is situated inside the end of the quill 31.

We claim as our invention:

1. In a draw-works, the combination of: a line shaft adapted to rotate; a quill fixed to one end of said line shaft; a spool placed so that it is rotatable on said quill; a knob formed on said spool by means of which a flexible member may be attached to said spool; a clutch housing extending from said spool, said knob being located within the housing; a clutch cone secured so that it is slidable but not rotatable on said quill; and means for moving said cone into and out of engagement with said clutch housing.

2. In a draw-works, the combination of: a line shaft adapted to rotate; a quill fixed to one end of said line shaft; a spool placed so that it is rotatable on said quill; a cap secured to the end of said quill shaft for holding said spool on said quill; a knob formed on said spool by means of which a flexible member may be attached to said spool; a clutch housing extending from said spool; a clutch cone secured so that it is slidable but not rotatable on said quill; and means for moving said cone into and out of engagement with said clutch housing, said knob being substantially located within the housing and removed from the operative surface of the spool.

3. In a draw works, the combination of: a line shaft mounted in suitable bearings in which it is free to rotate; a hollow quill mounted on one end of said shaft and extending outwardly from said shaft; a cap closing the outer end of said quill and extending radially beyond the periphery of said quill; feather keys fixed in the periphery of said quill at the inner end thereof; a spool mounted to rotate freely on said quill but restrained from axial movement thereon in one direction by said cap and in the other direction by said feather keys; a clutch mounted on the inner end of said quill and restrained from rotation thereon by said feather keys, said clutch being free to slide axially on said keys; means providing a driving engagement between said clutch and said spool; and means for forcing said clutch and spool into driving engagement.

4. In a draw works, the combination of: a line shaft mounted in suitable bearings in which it is free to rotate; a hollow quill mounted on one end of said shaft and extending outwardly from said shaft; a key for preventing rotation between said quill and said shaft; a cap closing the outer end of said quill and extending radially beyond the periphery of said quill; feather keys fixed in the periphery of said quill at the inner end thereof; a spool mounted to rotate freely on said quill but restrained from axial movement thereon in one direction by said cap and in the other direction by said feather keys; a clutch mounted on the inner end of said quill and restrained from rotation thereon by said feather keys, said clutch being free to slide axially on said keys; means providing a driving engagement between said clutch and said spool; and means for forcing said clutch and spool into driving engagement.

5. In a device of the character described, the combination of a line shaft adapted to rotate, a quill fixed to one end of the line shaft and enveloping a substantial portion thereof, a spool placed on the quill at one end thereof and rotatable thereon, a clutch housing extending from the spool, a clutch cone mounted upon the quill at the inner portion of the quill and keyed thereto to permit slidability but not rotatability of the clutch cone relative to the quill, and a cap engaging the edges of both the quill and the spool and means for fastening the cap to the shaft, said cap having an inwardly extending portion fitting within the tubular confines of the quill and serving as a centering medium therefor.

6. In draw works, the combination of: a line shaft adapted to rotate, a supporting device for the line shaft, said line shaft having a stud end protruding through said support and of relatively small length, a quill fixed to the end of the stud shaft, a spool placed so that it is rotatable on the quill, a clutch housing extending from the spool, a clutch cone mounted so that it is slidable but not rotatable on the quill, means for bringing the cone into and out of engagement with the clutch housing, said quill enclosing substantially the entire portion of the stud shaft and mounted closely to the support, the quill spool, clutch housing, and cone mounted thereon being attachable to the clutch shaft and removable therefrom as a unitary assemblage.

7. In draw works, the combination of a line shaft adapted to rotate, a quill fixed to one end of said line shaft, a spool placed so that it is rotatable on said quill, a clutch housing element extending from said spool, a clutch cone element mounted upon so that it is slidable on said quill, a longitudinal interlocking connection between the clutch cone element and the quill preventing rotatability of the clutch cone element relative to the quill but permitting slidability thereon, means for moving said cone clutch element into and out of engagement with said clutch housing, a cap element secured to one end of the shaft and abuttingly engaging the exterior edges of both the quill and the spool.

In testimony whereof, we have hereunto set our hands at Los Angeles, California, this 14th day of September, 1925.

LUTHER S. COX.
HOMER A. DELANEY.

CERTIFICATE OF CORRECTION.

Patent No. 1,727,750.　　　　　　　　　Granted September 10, 1929, to

LUTHER S. COX ET AL.

It is hereby certified that error appears in the printed specification of the above numbered patent requiring correction as follows: Page 3, line 34, claim 2, strike out the word "quill"; and that the said Letters Patent should be read with this correction therein that the same may conform to the record of the case in the Patent Office.

Signed and sealed this 29th day of October, A. D. 1929.

(Seal)　　　　　　　　　　　　　　　　　　　　M. J. Moore,
　　　　　　　　　　　　　　　　　　　Acting Commissioner of Patents.

of engagement with said clutch housing, a cap element secured to one end of the shaft and abuttingly engaging the exterior edges of both the quill and the spool.

In testimony whereof, we have hereunto set our hands at Los Angeles, California, this 14th day of September, 1925.

LUTHER S. COX.
HOMER A. DELANEY.

CERTIFICATE OF CORRECTION.

Patent No. 1,727,750.                    Granted September 10, 1929, to

LUTHER S. COX ET AL.

It is hereby certified that error appears in the printed specification of the above numbered patent requiring correction as follows: Page 3, line 34, claim 2, strike out the word "quill"; and that the said Letters Patent should be read with this correction therein that the same may conform to the record of the case in the Patent Office.

Signed and sealed this 29th day of October, A. D. 1929.

(Seal)

M. J. Moore,
Acting Commissioner of Patents.